United States Patent Office 3,720,752
Patented Mar. 13, 1973

3,720,752
MASSIVE METAL HYDRIDE STRUCTURES AND METHODS FOR THEIR PREPARATION
Robert Van Houten, 7685 De Mar Road, Cincinnati, Ohio 45243
No Drawing. Continuation-in-part of application Ser. No. 240,186, Nov. 26, 1962. This application Apr. 11, 1967, Ser. No. 634,019
Int. Cl. C01g *43/00*
U.S. Cl. 423—255                    7 Claims

ABSTRACT OF THE DISCLOSURE

A massive metal hydride, deuteride, or tritide matrix structure selected from at least one metal consisting of a Group III–B metal (Sc, Y, La); a Group IV–B metal (Zr, Ti, Hf); a Group V–B metal (V, Nb, Ta); a 4f rare earth metal having an atomic number 57–71, inclusive; 5f rare earth metal having an atomic number 90–100, inclusive, and alloys thereof, and a grain growth inhibiting concentration of at least one additive selected from carbon, graphite, boron; a carbide, boride, or hydride of the matrix metal dispersed in the matrix structure.

---

This application is a continuation-in-part of my copending application Ser. No. 240,186, filed Nov. 26, 1966, now abandoned.

The invention described herein was made in the course of, or under, a contract with the United States Atomic Energy Commission.

SUMMARY OF THE INVENTION

This invention relates to a massive metal hydride, deuteride, or tritide matrix, structure selected from at least one metal consisting of a Group III–B metal (Sc, Y, La); a Group IV–B metal (Zr, Ti, Hf); a Group V–B metal (V, Nb, Ta); a 4f rare earth metal having an atomic number from 57–71, inclusive; 5f rare earth metal having an atomic number from 90–100, inclusive, and alloys thereof, and a grain growth inhibiting concentration of at least one additive selected from carbon, graphite, boron; a carbide, boride, or hydride of the selected metal dispersed in a metal or metal hydride matrix and to methods for their production.

BACKGROUND OF THE INVENTION

A need exists, and it is an object of this invention to provide, for thermally and chemically stable massive and non-massive metal hydride structures for use in shield, reflector, moderator, moderator-fuel control, and applications in nuclear reactor components.

In the following description the quantity of hydrogen in a hydrided material is expressed as the number of hydrogen atoms/cc. of material. Because the number is very high it is divided by $10^{22}$ and the resultant number is referred to as $N_H$. The $N_H$ of a piece of hydrided zirconium, for example, may be calculated from the formula:

$N_H$ = Density in grams/cm.$^3$ ($\rho$) × Wgt. fraction of H $$\times \frac{\text{Avogadro's constant } (6.02 \times 10^{23})}{10^{22} \times (\text{atomic mass} = 1.007)}$$

$$= \text{Wgt. fraction of } H \times \frac{\rho \text{gms.}}{\text{cm.}^3} \times 59.7$$

In the description, reference to hydrided structures and methods for their preparation apply in a parallel manner to deuterided and tritided structures.

In the case where the hydride is to function as a neutron moderator or reflector, it is desirable to have a material with the highest hydrogen density, i.e., one with a maximum $N_H$. Unfortunately, as the hydrides amenable for treatment by this invention approach maximum hydrogen stoichiometry, they become extremely brittle and may have a distinct tendency to crumble to powder. In fact, maximum theoretical density hydrogen of a massive hydrided structure may never be reached because of the brittle character of the hydride. It is, therefore, an object of this invention to provide methods and means for imparting sufficient strength to a massive hydride structure so as to maintain its physical integrity even under prolonged thermal cycling in a going nuclear reactor.

The reaction of hydrogen with the aforementioned metals and alloys is a diffusion controlled exothermic process which normally results in expansion of the metal lattice as the hydrogen enters portions of the lattice. This results in a decrease in density and represents, in the case of the zirconium-to-zirconium di-hydride reaction, for example, a change of about 17% in volume. Such changes produce severe stresses in the massive material since the diffusive nature of the process results in large hydrogen concentration variations within the body. In the typical case of zirconium, the hydrogen reacts with the metal at relatively low temperatures. The surface area of the body absorbs hydrogen and expands. Depending on the nature of the base metal and its hydride, cracking or plastic deformation of the underlying metal occurs or the surface hydride crumbles compressively. Then, when the underlying metal becomes hydrided and therefore expands, the overlying hydride is placed in tension and it cracks. The result is that the surface hydride cracks and/or crumbles to powder, and as the underlying metal layers are hydrided the crumbling process continues until the entire hydrided structure is cracked and/or crumbled to powder.

THE PRIOR ART

The changes in hydrogen concentration gradients in the volume of the hydriding body contribute to the resultant cracking and powdering. The prevention of cracking then would appear to be clearly a matter of preventing large concentration gradients within the body and prior efforts to alleviate this problem have involved adaptations in the hydriding process. Thus, in one case, hydriding is initiated at very high temperatures, so that the surface layer is hydrided at a rate and to a composition which is not strikingly different from the metal within the internal volume of the body being hydrided. Also, the highest local hydrogen contents attainable at a given system pressure are drastically reduced as the specimen temperature rises. Therefore, the maximum attainable concentration and volume gradients from surface to core are reduced. A stepwise hydriding procedure is then followed until the desired overall composition is obtained.

In a similar technique, hydriding is initiated only at the desired final equilibration temperature, but the rate of hydriding at said temperature is limited so that more time is allowed for hydrogen redistribution within the workpiece, and no adverse hydrogen concentration gradient is built up in the hydriding workpiece. Other methods involve a combination of the two aforementioned approaches. In addition, still other hydriding procedures take into account the abrupt transition in phase which occurs in certain hydrides. For example, in hydriding zirconium one investigator stated that it was found beneficial to carry out the hydriding through a particular transition phase in order to avoid abrupt density changes.

The technique of isochore cooling as a route to maintaining uniform hydrogen distribution in a hydrided body has also been applied to making massive hydride structures. An isochore is a line of constant composition on a plot of temperature vs. pressure. Once an isochore line has been established by equilibrium studies, and equipment is set up capable of controlling temperature and pressures simultaneously, it is then possible to maintain the initial hydrogen composition of a given solid hydride while cooling from elevated temperatures and pressure without either absorbing hydrogen from or evolving it to the surrounding atmosphere. The formed hydride of the desired composition is cooled to room temperature along the isochore line without effecting a change in its composition (and particularly without inducing concentration gradients and volume changes at the specimen surface).

While the aforementioned processes and combinations thereof will produce uniformly hydrided pieces to a specific $N_H$ value, they do not cover other factors which lead to a sound, strong, and crack-free hydrided structure. In particular, they do not prevent or even effectively resist cracking (due to the extremely brittle nature of massive hydride pieces having a high $N_H$ value) either during hydriding or during use.

DESCRIPTION OF THE INVENTION

Since, as previously discussed, it is known that as the $N_H$ value of a selected metal hydride increases, the effective strength of the body and its tendency to resist cracking as well as its ability to maintain its initial hydrogen content under high temperature service conditions decreases, and since experience has shown that the salutary effects of uniform hydriding to high $N_H$ values can be negated where the intrinsically low effective strength of the hydrided structure is not considered in the fabrication of these materials, it is, therefore, an object of this invention to provide an improved crack-free massive hydrided, deuterided, or tritided structure of maximum and uniform hydrogen composition.

Another object is to provide a class of dispersion-strengthening agents for use in preventing cracking in metals undergoing conversion to their respective hydrides, deuterides, or tritides wherein these same dispersion-strengthening agents also act to strengthen the resultant hydride and maintain or improve its hydrogen retention qualities. Another object is to provide a specific class of dispersion agents which function to prevent cracking of metals or alloys undergoing conversion to a hydride of uniform hydrogen composition.

This invention is based on the discovery that the incidence of cracking in metal or alloy structures undergoing conversion to a hydrided structure or the incidence of cracking of the hydride structure under high temperature service conditions can be materially reduced or eliminated if a selected grain growth inhibiting agent is included in the material to be hydrided.

In order to obtain a hydrided structure to a desired $N_H$ level, the initial material must be exposed to hydrogen for a period of time ranging from several hours to several days depending on the geometry of the starting metal as well as the $N_H$ level desired in the final hydrided structure. The surface conditioning temperatures and reaction temperatures, as well as cooling cycles, take place under conditions of maximum metal as well as metal hydride grain growth. In other words, the conditions necessary to reach a maximum $N_H$ value lead to maximum grain growth. In the case of titanium and zirconium, these coarse grains cause the formation of extensive "surfaces of weakness" which remain along the original high temperature beta and delta grain boundaries even after phase transformation. Thus, modification of the hydriding cycle in order to allow attainment of maximum $N_H$ values is effectively negated by the inherently brittle nature of high $N_H$ materials and by the damaging effects inherent in all previously identified hydriding cycles.

I have found that when carbon or boron in elemental form, compounds of boron and carbon, such as carbides, borides, and hydrides of the selected transition metals or 4f or 5f metals are incorporated into the material to be hydrided, the grain growth of the metal to be hydrided is inhibited as it is heated to the desired or required reaction temperature. More surprisingly, the grain growth of the synthesized metal hydride will also be materially reduced in comparison to a metal hydride formed (or operated) at the same temperature but in the absence of the selected grain growth-inhibiting additive. Thus, reduction in the grain growth of the metal in the course of the hydriding reaction also reduces the ultimate grain size of the metal hydride. Since the grain growth inhibitor also reduces the rate of growth of metal hydride crystals (grains) and also maintains maximum randomness of hydride grain orientation, the net result is a massive metal hydrided structure which retains maximum physical integrity despite the well known pronounced tendency of such structures to rupture during or after the hydriding process.

The selected grain growth inhibitor can be chosen from any carbide, boride, or stable hydride of the selected transition metal, and usually from the carbide or boride of any 4f or 5f metal or alloy at a concentration sufficient to ensure that the equilibrium solubility is closely approached or slightly exceeded over the entire temperature use range. The additive may initially consist of elemental carbon or boron which will combine with the metal or alloy prior to or during hydriding in sufficient amounts as to produce the grain growth-inhibiting effect. Specific additive concentrations are a matter of routine investigation and will depend on the material to be hydrided and the grain growth-inhibiting effect of the particular additive, and depend both on the additive solubility as a binary or ternary constituent and on the atomic weight of the metal. In general, a grain growth-inhibiting concentration will require from 0.05 to no more than 5 wt. percent (based on the weight of metal) to prevent cracking at a desired $N_H$ level. For example, elemental carbon when added in amounts ranging from 0.1 to 5% (by weight of metal) to a selected transition metal inhibits grain growth that would otherwise take place during fabrication of the metal or alloy to the hydride. Grain refinement of the final hydride structure has frequently been noted to be so radical that it can be detected visually, i.e., without the aid of a microscope.

In order to practice this invention, the grain growth inhibitor must be uniformly distributed, preferably as a fine dispersion in the metal or alloy to be hydrided. In addition, the fabrication history of the part to be hydrided should be controlled to yield a fine metal grain size; for while it is within the scope of the present inventive concept to effect grain growth inhibition, the selected additive will not reduce the grain size of a starting piece.

As a matter of practical convenience, it is desirable to fabricate a metal or alloy to be hydrided close to the geometry desired in the final hydrided structure having due regard for the increase in volume effected by the hydriding reaction. The final dimensions may then be attained by machining or honing the hydrided structure. Therefore, the pre-hydride fabrication history should be such as to start with an initial fine-grain size structure small enough such that the carbide or boride additives will function effectively as grain growth-inhibiting agents during the hydriding reaction.

The grain growth in a material at high $N_H$ values is apparently a function of several parameters; these including specimen size and geometry. This is true because the time the material must be held at temperature for complete hydriding is a function of the depth that must be penetrated by the hydrogen. Grain growth is associated with time at temperature and since mechanical properties will be affected by grain size, significant differences in mechanical properties may be anticipated for different geometries in the case where the grain growth-inhibiting additives are not used. Where grain growth-inhibiting additives are used, differences in mechanical properties due to the size and geometry of the final hydrided structure may still be noted but the effect of size and geometry will have been considerably reduced due to the strengthening effect achieved by the grain growth inhibition of the additives.

To reiterate, the practice of this invention assumes that the metal grain size and microstructure of the starting metal or alloy to be used is of sufficient quality and size as to be controllable by the grain growth additives of this invention. This only serves to say that the prior fabrication history of the workpiece to be hydrided must be controlled in such a way as to produce a workpiece having a desirably fine grain size and microstructure. The pre-hydrided metal specimens produced by non-powder metallurgy methods are normally annealed after being worked to obtain required geometries. The lower the annealing temperature used, the finer the grain size which will be produced in the pre-hydrided specimen. It is usually desirable, in order to obtain the desired final grain structure, to avoid subsequent severe cold working and to perform any hot working operations below the recrystalization temperature of the workpiece. A powder metallurgy approach usually produces a good initial microstructure without working and recrystallizing.

The principle of the process of this invention involves the induction of a uniformly precipitated phase within the volume of a metal or alloy workpiece to be hydrided. In its principal aspect the invention comprises forming a homogeneous mixture of the metal components of the workpiece to be hydrided and a grain growth-inhibiting additive at a concentration which will inhibit both metal and hydride grain growth at the hydride forming temperatures. The grain growth inhibiting additive is used at a concentration sufficient to assure that the equilibrium solubility is approached and slightly exceeded over the entire use temperature range. In general terms, the precipitated phase is derived from the addition of carbon and/or boron in elemental form to the required concentration. In another case, carbon and boron are added as carbide or boride, preferably as the carbide or boride of the metal or alloy to be hydrided.

Still another form of effecting grain growth inhibiting of the metal and hydride takes advantage of the limited solubility of a metal hydride in its corresponding metal matrix. A specific application of this technique can be found in the zirconium hydride system which will be discussed in a later detailed example.

The process of this invention may be conveniently discussed in terms of a pre-hydriding operation followed by the actual hydriding process conditioned by the presence of grain growth-inhibiting concentrations of a selected additive.

The metal or alloy workpiece to be hydrided will consist of a rough shape in the approximate size and geometry of the finally desired massive hydride shape. When the workpiece is in such form the process of this invention may include arc melting a selected metal or alloy, incorporating an effective grain growth-inhibiting concentration of additive to the metal or alloy in a quantity by weight such that the solubility of the selected additive is exceeded at or above the intended use temperature and wherein the resultant precipitated phase is stabilized by hot and/or cold working operations which promote the formation of a uniformly homogeneously dispersed precipitated phase.

In addition to arc melting, the desired homogeneous dispersion may also be effected by vacuum hot pressing, by pressing (or extruding) and sintering, and by vacuum induction melting. Induction melting is the preferred technique for producing a fine-grained and uniformly distributed phase because of the enhanced homogeneity of the dispersion produced by the stirring action of the induction coil. Arc melted or vacuum hot pressed ingots usually have to be warm worked and/or rolled and then heat treated to reduce cracking during hydriding and to obtain maximum hydride strength.

The hydride material produced from bodies containing the precipitated phase will have slightly lower hydrogen density than the body without the precipitated phase, said reduction being in direct relation to the dilution or substitutional effect of the additive. Despite this, the technique of the present invention allows production of essentially crack-free massive zirconium hydride structures hydrided to a $N_H$ value of as high as $7 \times 10^{22}$ atoms of hydrogen/cc. of material; titanium-base alloys containing an approximate dispersed phase have been hydrided to a hydrogen density of up to about $9 \times 10^{22}$ atoms of hydrogen/cc. of material (equivalent of a $N_H$ of 9); yttrium-base materials have been hydrided to a $N_H$ in the range of 5.1 to 5.5.

Powder metallurgical techniques may also be used to form a homogeneous dispersion of the grain growth inhibitor in a matrix of the selected metal or alloy. In fact, by using powder metallurgy techniques it is entirely appropriate to start with a given metal hydride mixed with a suitable grain growth inhibitor. The hydride-inhibitor mixture can then be pressed (or extruded), sintered, hot pressed or vacuum hot pressed and rehydrided, as required to a material having a desired $N_H$ value.

When the starting material is in wrought form, it is simply heated in vacuum to a condition of increased plasticity generally at about 900° C. and hydrogen is added until the desired composition is reached. The grain refinement efficiency of the selected additive will operate during the total hydriding process to inhibit metal grain growth as well as hydride grain growth. In fact, it has been found that the selected grain growth inhibitors are effective with zirconium-base materials at temperatures as high as 2000° F.–2200° F.—a temperature range which is not at all uncommon when large-sized zirconium-base materials are subjected to a hydriding sequence.

EXAMPLE I

Three ingots of reactor grade zirconium metal, 5" in diameter and 8" long, were vacuum arc melted and extruded to ⅜" thick by 3" wide bar according to the following procedure:

(1) One ingot (A) was double vacuum arc melted in a vacuum arc furnace, with 0.4 w/o carbon, as zirconium carbide, mixed into the original sponge electrode. The machine ingot was then extruded at 1500° F., with a 16/1 extrusion ratio (original/final cross section area ratio), in order to obtain a uniform dispersion of zirconium carbide, and then cooled to room temperature.

(2) The same procedure was repeated with the second and third zirconium ingots (B and C), except that no carbide, either as elemental carbon or as a metal carbide, was introduced into the ingots during melting.

The as-extruded microstructures of extruded bar A (with the additive) and bar B (without the additive) showed substantially the same grain size. The as-extruded grain size of extruded bar C (without the additive) was slightly coarser than the grain size of bars A and B, so it was then cold worked and warm worked to a total reduction in thickness of 20% and was then recrystallized-annealed at 1440° F. to bring it to the same grain size as bars A and B. Therefore, specimens cut from bars A (with the additive) and B and C (without the additive) for a high temperature grain growth test all had the same initial grain size.

In the grain growth test, specimens from bars A, B and C were placed in the vacuum furnace, the furnace was evacuated, heated to 2000° F. in vacuum, held at 2000° F. for ½ hour in vacuum and then cooled to room temperature, still in vacuum. When the cooled specimens were removed from the vacuum furnace and examined for grain size, those specimens from extrusion A (containing the additive in a concentration of 0.3–0.4 w/o carbon) had no change in grain size, either while in the low temperature alpha ($\alpha$) phase or in the high temperature beta ($\beta$) phase. In contrast, the post test microstructures of the specimens from extruded bars B and C (with no additive) showed that during the time when the specimens had been in the beta phase (and at temperatures above about 1900° F.), their grain size had grown phenomenally, i.e., to more than 1000 times their original alpha grain size, in only ½ hour at 2000° F. Then, as the additive-free specimens were vacuum cooled, colonies of alpha grains, each grain in the colony having a common orientation, formed within the boundaries of the terminal beta size grains (as explained on pp. 506 and 507 of Lustman and Kerze, "Metallurgy of Zirconium," National Nuclear Energy Series, VII–4, McGraw Hill, 1955) but left planes of weakness in the regions of the prior beta-grain boundaries (as also explained in Lustman and Kerze, p. 507).

The extreme effectiveness of the additive in inhibiting beta phase zirconium grain growth is apparent from the results of this experiment.

Specimens cut from the as-extruded ingots A, B and C were then hydrided according to the following schedule:

The specimens were grit blasted, placed in a chamber which was then evacuated, heated to 1900° F. over a 6-hour period, and held there for one hour. Then, the temperature was lowered to 1700° F., and hydrogen was introduced at a rate of 20 cu. ft./hour until the pressure rose to 900 mm. Hg, absolute (about 6 hours). Then after the work remained at 1700° F. for another 6 hours, the furnace temperature was slowly lowered to 1540° F. over a 5-hour period. Then the isochore was followed down and the specimens removed from the furnace. Each had an $N_H$ of 5.7–6.0. The (hydrided) specimens cut from ingot A (containing the additive) were all sound, but the other (hydrided) specimens, which had been cut from bars B and C (with no additive) were all badly cracked. The cracked specimens had long columnar grains which were oriented perpendicular to the specimen surfaces and which met at the center planes of the specimens. The uncracked specimens all had small, randomly oriented grains, because of the presence of the additive.

In a manner similar to the procedure outlined in the foregoing example, I have formed crack-free massive hydride structures of titanium, zirconium, hafnium, yttrium, thorium, vanadium, niobium, tantalum, and binary, ternary, and quaternary combinations of the elements using the class of previously defined additives. Specific examples of compositions which have been used to demonstrate the benefits of grain growth inhibition during the hydriding of massive metal structures are listed below.

| Matrix phase (wt. percent) | Dispersed phase (wt. percent) |
| --- | --- |
| Ti 5W | 3 $B_4C$ |
| Ti 5W | 3 $ZrB_2$ |
| Ti | 3 TaB |
| Ti 2Al | 3 BN |
| Ti 2Al | 3 $B_4C$ |
| Ti 2Al | 5 ZrC |
| Ti 5W 2Al | 3 BN |
| Ti 5W 2Al | 3 $ZrB_2$ |
| Zr | 0.5–5 ZrC |
| Zr 3U | 1 BN |
| Th 6U | 1 TiC |
| Th 12U | 1 TiC |
| Th 6U | 1 $B_4C$ |
| Th 12U | 1 $B_4C$ |
| Ti | 5 $TiB_2$ |
| Ti 20Zr | 3 BN |
| Ti 20Zr | 5 $TiB_2$ |
| Ti 20Zr | 3 $B_4C$ |
| Ti 30Y | 3 BN |
| Ti 30Y | 3 $B_4C$ |
| Ti 30Y | 5 ZrC |
| Ti 5W | 3 BN |
| Ti 5W | 3 $TiB_2$ |
| Zr | 1 B |
| Ti 5W | 3 $ZrB_2$ |
| Y | 1 B 1.13C |
| Th 5Zr | 5 ZrC |
| Th 5Zr 3U | 5 ZrC |
| Th 13Zr | 5 ZrC |
| Th 13Zr 3U | 5 ZrC |
| Th 25 Zr | 5 ZrC |
| Th 25Zr 3U | 5 ZrC |
| Th 50Zr | 5 ZrC |
| Th 50Zr 3U | 5 ZrC |
| Th 75Zr | 5 ZrC |
| Th 75Zr 3U | 5 ZrC |

In each case my findings have been that the inclusion of these defined classes of additives as a dispersed phase in the metal or alloy produces a significantly greater percentage of crack-free hydrided or deuterided massive pieces as compared to the number of crack-free specimens without the additive. As the size of the metal (or alloy) increases and as the geometry becomes more complex, the need for the grain growth inhibiting becomes increasingly more important to ensure production of crack-free specimens.

EXAMPLE II

As previously mentioned, one of the most unique applications involved in the concept of control of pre-hydrided metal grain size and microstructure is demonstrable in the fabrication of massive refractory zirconium hydride structures. I have found that by careful manipulation of the hydriding sequence of zirconium or zirconium-base alloy specimen it is possible to induce homogeneous precipitation of a finely-divided zirconium hydride precipitated phase which acts to inhibit grain growth of the metal as well as the hydride. In that case then it is clear that it is not necessary to provide an external additive as the source of the precipitated phase, but can be generated internally by proper manipulation of the hydriding process conditions.

In a typical hydriding cycle, a zirconium-base material is heated in a vacuum furnace linearly to a temperature of about 500° C. to outgas the furnace and the specimen. After a suitable out-gassing period which may run from 1 to about 20 hours, a small amount of high purity hydrogen is introduced. At 500° C. the hydrogen has a satisfactory diffusion rate to thus effect the satisfactory rate of hydriding. Enough hydrogen is introduced to induce formation of a precipitated delta zirconium hydride phase. The quantity of hydrogen introduced is that amount which will effect the precipitation of a number of zirconium hydride nucleation sites through the volume of the zirconium matrix body, and is typically no more than about 0.04% of the total work load weight. The temperature is then increased linearly to about 950° C. At that point or after a short 950° C. "soak," the high purity hydrogen having a dewpoint of −50° C. is passed over palladium and through titanium sponge and foil and/or through calcium, zirconium, or uranium getters, and is then introduced at a rate proportional to the total surface area of the work load. For example, when the total surface is three square meters (0.05 square meter/kilogram), the hydrogen gas is introduced at a rate of perhaps 500 liters/hour. Thus, by this technique there is very little immediate change in the hydrogen pressure because all available hydrogen is immediately absorbed in the work and has sufficient mobility that the effective surface hydrogen content is relatively low, i.e., has an effective equilibrium hydrogen partial pressure of only a few microns. The hydrogen pressure within the furnace therefore will typically not exceed more than about 10 millimeters mercury during the first 4–8 hours at 940° C.–906° C. in any hydriding cycle (and often for much longer) because the effective surface hydrogen content of the hydride never gets high enough until at least the indicated amount of hydrogen has been absorbed. The presence of the numerous nucleation sites produced by the original hydrogen inoculation appears to inhibit adversely high beta phase grain growth during the main hydrogen absorption period. Gas pressure then will slowly begin to rise for a period of time to the control pressure of about 900 millimeters mercury while the work is held at temperature until the desired equilibrium composition is attained. The equilibrium composition will correspond to about 1.2 w/o hydrogen, a hydrogen/zirconium ratio of about 1.1/1.0. Upon reaching the equilibrium composition the work is cooled slowly under relatively constant pressure until the work composition hovers about the beta to beta-delta phase change. Upon reaching this composition, the hydrogen pressure of the system is reduced. This sharp pressure reduction cools the specimen, i.e., since hydrogen loss results in cooling and also serves to hold the work specimen hydrogen content relatively constant until and after the specimen has cooled and the internal temperature gradient has dissipated and delta phase nucleation has had a chance to occur within the volume of the piece. At this point then, the effect of the immediate prior treatment has been to induce proliferation of homogeneously scattered precipitated delta zirconium hydride—this precipitate serving to inhibit grain growth during the immediately subsequent portion of the hydriding cycle when the temperature of the internal volume of the hydriding body is high enough for appreciable grain growth to occur. Thus, the previous hydriding has effected a condition whereby the workpiece has, in effect, been inoculated with grain growth-inhibiting amounts of a precipitation zirconium hydride phase. Subsequent treatment is then employed to reach a desired $N_H$ value and this occurs simply by stepwise increases in the retort hydrogen pressure and, if required, a lowering of the temperature until the pressure and temperature conditions are sufficient to reach a desired composition, i.e., $N_H$ value.

Having effected proliferation of the grain growth-inhibiting precipitated phase of delta zirconium hydride, followed by hydriding to an all-delta phase, and having reached a desired $N_H$ value, the workpiece is finally brought down to room temperature. This may be done by the well-known expedient of "following the temperature-pressure isochore down." This is a time-consuming procedure, and instead, I prefer to close-off the hydrogen supply and then rapidly reduce the pressure at constant temperature to a level based on the total weight and surface area of the work and the ratio of the retort free volume to the work-free weight. The purpose of this rapid reduction in furnace or retort pressure just prior to final lowering of the temperature is to assure the work surface desorption and reabsorption of hydrogen will not occur at such a rate as to result in adverse concentration gradients between the surface and the internal volume of the work. Thus, as soon as the pressure is pumped down, the furnace temperature is also lowered at 10° intervals every 20 to 30 minutes, and finally when the work has reached a temperature of 700° F.–900° F. the furnace power is turned off and the retort cooled to room temperature by natural convection.

I have thus described a technique of metal and hydride grain growth control which does not require the external addition of a grain growth precipitating agent. In short, I can achieve metal and metal hydride grain growth control simply by controlling the hydriding process parameters in such a manner as to inoculate the volume of the hydriding body at a period when large concentration and temperature gradients do not exist. Thus, at the higher hydriding temperatures when metal and metal hydriding grain growth rate is rapid the hydriding body in effect "sees" a network of precipitated grain growth-inhibiting particles. Thus, it has been my experience that this technique involving precipitation of the delta zirconium hydride particles applies to total hydriding of a workpiece and allows hydriding of zirconium-base materials to form crack-free pieces having a $N_H$ value running from 6.0–6.6 and above. This technique of grain growth inhibition in zirconium bodies has an advantage over hydride materials containing external additions of grain growth-inhibiting agents, where the final hydrided material will have a slightly lower hydrogen density in direct relation to the dilution or substitutional effect of the additive. In the delta zirconium hydride precipitation technique there is no final (net dilution or substitutional effect.

It should be noted that while the inoculation or proliferation of metal hydride sites in the volume of the piece to be hydrided is illustrated with zirconium, it can be used with equal effectiveness in hydriding any metal which undergoes a phase change as its $N_H$ value increases during the hydriding process.

What is claimed is:

1. An improved method for inhibiting grain growth in a structure to be hydrided selected from at least one metal consisting of a Group III–B metal, a Group IV–B metal, a Group V–B metal, a 4f rare earth metal having an atomic number in the range 58–71, a 5f rare earth metal having an atomic number in the range 90–104, and alloys thereof which comprises incorporating a grain growth inhibiting concentration of at least one additive selected from the group consisting of carbon, graphite, boron; a carbide, boride, or hydride of the selected metal, as a dispersed phase, and then hydriding said structure.

2. The method according to claim 1 in which the concentration of the additives is in the range 0.05 to 5 weight percent based on the weight of metal.

3. An improved method for inhibiting grain growth in a hydride structure selected from at least one metal consisting of a Group III–B metal, a Group IV metal, a Group V–B metal, a 4f rare earth metal having an atomic number in the range 58–71, a 5f rare earth metal having an atomic number in the range 90–104, and alloys thereof which comprises melting said selected metal, adding at least one grain growth inhibiting concentration of a material selected from the group consisting of carbon, graphite, boron; a carbide or boride of the selected metal, to the melt, stirring the mixture for homogenization, and then hydriding the mixture.

4. The method according to claim 3 in which melting is conducted in vacuum or in an inert atmosphere.

5. An improved method for inhibiting grain growth in a hydride structure which comprises forming a powdered mixture from at least one metal selected from the group consisting of a Group III–B metal, a Group IV–B metal, a Group V–B metal, a 4f rare earth metal, a 5f rare earth metal, and alloys thereof, and from 0.1 to 5.0 percent by weight of a grain growth-inhibiting additive selected from carbon, graphite, boron; a carbide, boride, or hydride of the selected metal uniformly dispersed in the selected metal, compacting the mixture and then hydriding the compact.

6. As a new article of manufacture, a matrix phase consisting of the hydride of a metal selected from the group consisting of a Group III–B metal, a Group IV–B metal, a Group V–B metal, a 4f rare earth metal having an atomic number in the range 58–71, a 5f rare earth metal having an atomic number in the range 90–104, and alloys thereof, and a dispersed phase containing a small amount of a material selected from the group consisting of carbon, graphite, boron; a carbide, boride, or hydride of the selected metal.

7. The article of claim 6 in which the concentration of the dispersed phase material is in the range 0.1 to 5.0% by weight of the selected metal.

References Cited

UNITED STATES PATENTS

| | | | |
|---|---|---|---|
| 1,179,009 | 4/1916 | Just | 75—202 X |
| 1,968,067 | 7/1934 | Balke | 75—202 X |
| 2,073,826 | 3/1937 | Balke | 75—202 X |
| 2,440,999 | 5/1948 | Anderson | 252—301.1 |
| 2,678,870 | 5/1954 | Cooper | 23—345 |
| 3,162,528 | 12/1964 | Williams et al. | 75—122.7 |
| 3,167,428 | 1/1965 | Globus | 29—182.8 |

CARL D. QUARFORTH, Primary Examiner

B. HUNT, Assistant Examiner

U.S. Cl. X.R.

75—122.7; 176—89; 252—301.1 R; 423—252, 645